United States Patent
Heppner et al.

(10) Patent No.: US 10,507,791 B2
(45) Date of Patent: Dec. 17, 2019

(54) MOTOR VEHICLE STEERING LOCK

(71) Applicant: HUF HÜLSBECK & FÜRST GMBH & CO. KG, Velbert (DE)

(72) Inventors: Mario Heppner, Unterhaching (DE); Florian Schoeppe, Garching (DE)

(73) Assignee: Huf Huelsbeck & Fuerst GmbH & Co. KG, Velbert (DE)

(*) Notice: Subject to any disclaimer, the term of this patent is extended or adjusted under 35 U.S.C. 154(b) by 78 days.

(21) Appl. No.: 15/745,325

(22) PCT Filed: May 19, 2016

(86) PCT No.: PCT/EP2016/061254
§ 371 (c)(1),
(2) Date: Jan. 16, 2018

(87) PCT Pub. No.: WO2017/012734
PCT Pub. Date: Jan. 26, 2017

(65) Prior Publication Data
US 2018/0208154 A1    Jul. 26, 2018

(30) Foreign Application Priority Data
Jul. 21, 2015  (DE) .......................... 10 2015 111 832

(51) Int. Cl.
*B60R 25/021* (2013.01)
*B60R 25/20* (2013.01)
*E05B 79/10* (2014.01)

(52) U.S. Cl.
CPC ...... *B60R 25/021* (2013.01); *B60R 25/02115* (2013.01); *B60R 25/2063* (2013.01); *E05B 79/10* (2013.01)

(58) Field of Classification Search
CPC ............. B60R 25/021; B60R 25/02115; B60R 25/2063
(Continued)

(56) References Cited

U.S. PATENT DOCUMENTS 2,462,827 A * 2/1949 Feldmann ............. E05B 17/041
                                                70/379 R
2,687,637 A * 8/1954 Jacobi .................. E05B 1/0038
                                                70/224
(Continued)

FOREIGN PATENT DOCUMENTS

DE    92 02 367 U1    4/1992
DE    296 11 043 U1   8/1996
GB    1 333 779 A    10/1973

OTHER PUBLICATIONS

International Preliminary Report on Patentability, and English translation, of International Application No. PCT/EP2016/061254 dated Jan. 23, 2018, 10 pages.
(Continued)

*Primary Examiner* — Suzanne L Barrett
(74) *Attorney, Agent, or Firm* — Fay Sharpe LLP

(57) ABSTRACT

A motor vehicle steering lock includes a housing in which is disposed a lock cylinder including a selector shaft which can assume various rotational positions. An adjustment element of an ignition switch is movably coupled to the selector shaft and triggers a desired function of the motor vehicle depending upon the rotational position of the selector shaft. The selector shaft and the adjustment element are connected for a conjoint rotation via an intermediate compensating element that allows for a movement of the selector shaft in relation to the adjustment element in a first axis direction oriented radial to a longitudinal axis of the selector shaft and a movement of the adjustment element in relation to the selector shaft in a second axis direction perpendicular to the first axis direction.

10 Claims, 2 Drawing Sheets

(58) Field of Classification Search
USPC .......................................... 70/252, 182–186
See application file for complete search history.

(56) References Cited

U.S. PATENT DOCUMENTS

| | | | | |
|---|---|---|---|---|
| 2,691,290 A * | 10/1954 | Schlage | ................ | E05B 15/004 292/358 |
| 2,712,749 A * | 7/1955 | Quigley | ................ | E05B 17/04 70/129 |
| 3,143,874 A * | 8/1964 | Jacobi | ................ | E05B 17/041 70/379 R |
| 3,724,244 A * | 4/1973 | Schaumburg | ..... | B60R 25/02131 70/252 |
| 3,940,958 A * | 3/1976 | Kuroki | ............. | B60R 25/02126 70/186 |
| 4,068,510 A * | 1/1978 | Neary | .................... | E05B 9/105 70/379 R |
| 4,228,669 A * | 10/1980 | Bischoff | ................ | E05B 9/105 70/134 |
| 4,576,026 A * | 3/1986 | Kurt | ........................ | E05B 17/04 70/380 |
| 5,174,136 A * | 12/1992 | Thwing | ................ | E05B 17/04 70/371 |
| 5,363,678 A * | 11/1994 | Meckbach | ................ | E05B 67/24 70/379 R |
| 5,656,867 A * | 8/1997 | Kokubu | ................ | B60R 25/021 180/287 |
| 5,931,035 A * | 8/1999 | Bolton | .................... | E05B 9/084 70/367 |
| 6,145,356 A * | 11/2000 | Thwing | ................... | E05B 9/084 70/371 |
| 6,758,075 B1 * | 7/2004 | Thwing | ................... | E05B 11/00 70/372 |
| 6,886,381 B2 * | 5/2005 | Geurden | ............... | E05B 13/105 70/223 |
| 6,978,645 B2 * | 12/2005 | Shimon | ............... | E05B 17/0058 70/379 R |
| 7,870,772 B1 * | 1/2011 | Guo | ...................... | E05B 13/108 292/DIG. 27 |
| 9,376,838 B2 * | 6/2016 | Ino | ........................ | E05B 17/041 |
| 2004/0025549 A1 * | 2/2004 | Sandvoss | ............... | B60R 25/04 70/252 |
| 2006/0021402 A1 * | 2/2006 | Kai | .................... | B60R 25/02121 70/252 |
| 2010/0024495 A1 * | 2/2010 | Nakamoto | ............. | B60R 25/02 70/252 |
| 2014/0318197 A1 * | 10/2014 | Sugihara | ........... | B60R 25/02126 70/252 |
| 2016/0257285 A1 * | 9/2016 | Poggi | ................ | B60R 25/02102 |
| 2017/0040125 A1 * | 2/2017 | Okada | .................. | B60R 25/021 |
| 2017/0203718 A1 * | 7/2017 | Perrin | ............... | B60R 25/02115 |

OTHER PUBLICATIONS

International Search Report of International Application No. PCT/EP2016/061254 dated Jul. 18, 2016, 4 pages.

* cited by examiner

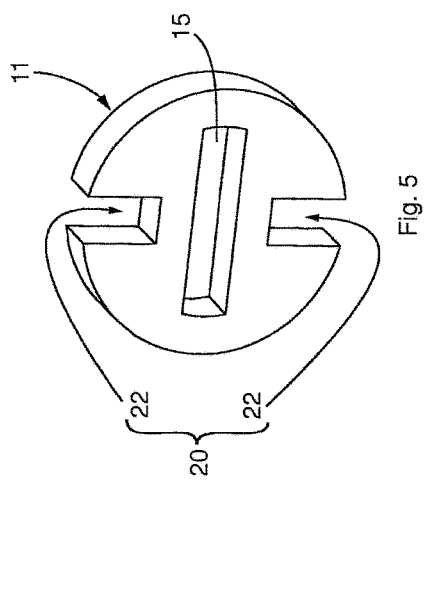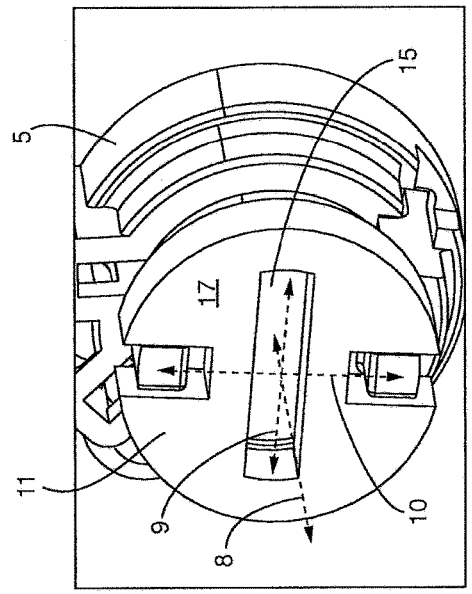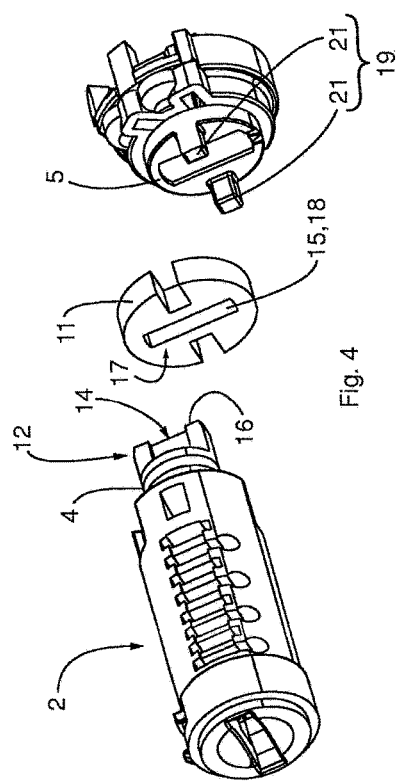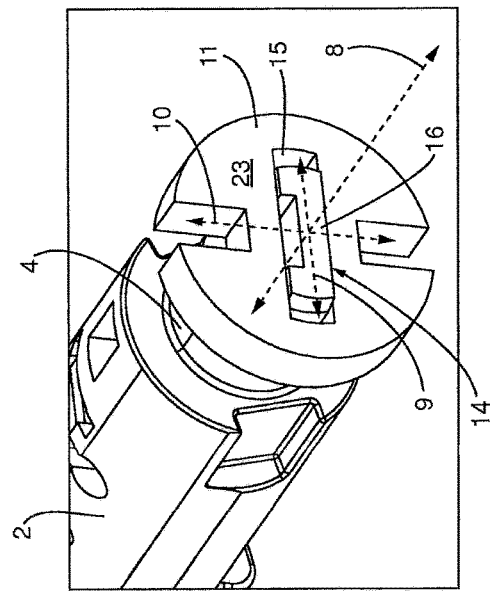

MOTOR VEHICLE STEERING LOCK

BACKGROUND

The invention relates to a motor vehicle steering lock that has a housing in which a lock cylinder is disposed with a selector shaft, which can assume various rotational positions, and an adjustment element of an ignition switch that is coupled in terms of movement to the selector shaft of the lock cylinder, which triggers a desired function in the motor vehicle depending on the rotational position of the selector shaft.

A motor vehicle steering lock of the type specified in the introductory paragraph is known, for example, from DE 92 02 367. A lock cylinder selector shaft is coupled to an adjustment element of an ignition switch with a plug-in connection in this known motor vehicle steering lock, in that a tab-shaped projection of the selector shaft, projecting in the longitudinal, or axial direction, is inserted into a slot-shaped receiver in the adjustment element. This plug-in connection transfers the rotation of a mechanical key, or ignition key, that is inserted into the lock cylinder and rotated, for example, when starting the motor vehicle. The selector shaft is rotated from a standby position or locked position into a working position during this rotation, wherein it can be rotated to a first stage, referred to as ACC, in which the power supply in the vehicle comes exclusively from the starter battery, to a second stage, in which the power supplies for ignition and motor loads are switched on, or to a third stage, in which the electrical starter is switched on, and a spring contact returns the ignition key to the second stage when it is released.

The plug-in connection known from the prior art compensates for tolerances in the longitudinal, or axial, direction of the selector shaft between the selector shaft and the adjustment element, which is of no significance, however, with regard to the switching performance. This would require compensation for tolerances in the direction of rotation, which is only possible, however, up to a rotation of no more than 90° in the plug-in connection known from the prior art, because the selector shaft is then tightened against the adjustment element. Moreover, tolerance problems in the plug-in connection lead to a canting of the fit, which ultimately results in an overload to the spring elements in the ignition switch that are come into contact with as a result of the rotation, and ultimately endangers the functionality and may lead to damage.

The fundamental object of the invention is to create a structurally simple and inexpensive motor vehicle steering lock, which solves the tolerance problems known from the prior art, and provides a coupling possibility for the selector shaft and adjustment element that relieves the tensions along the longitudinal axis.

BRIEF SUMMARY

With a motor vehicle steering lock of the type referred to in the introductory portion of the description, the problem is solved according to the invention in that the selector shaft of the lock cylinder and the adjustment element of the ignition switch are connected to one another via an intermediate compensating element for conjoint rotation allowing for a relative movement of the selector shaft to the adjustment element in a first axis direction, radial to the longitudinal axis of the selector shaft, and allowing for a relative movement of the adjustment element to the selector shaft in a second axis direction, perpendicular to the first axis direction.

Advantageous and useful designs and developments of the invention can be derived from the dependent claims.

A motor vehicle steering lock is provided by the invention, which is distinguished by a functional construction that is simple and inexpensive. With the motor vehicle steering locks from the prior art there was the problem that the coupling between the selector shaft of the lock cylinder and the adjustment element of the ignition switch did not compensate for tolerances in the rotational direction of the ignition key or in the rotational direction of the lock cylinder selector shaft, such that components of the ignition switch were overloaded and could become damaged. The invention now provides a solution that compensates for tolerances in the rotational direction of the connection of the lock cylinder selector shaft and the ignition switch adjustment element. The compensation for tolerances allows the selector shaft to move in relation to the adjustment element along a first axis direction, radial to the longitudinal axis of the selector shaft, and also allows the adjustment element to move in relation to the selector shaft in a second axis direction, perpendicular to the first axis direction. With the intermediate compensating element according to the invention there is a possibility of compensating for tolerances between the lock cylinder and the controlling adjustment element, also substantially simplifying the installation of these two components. It is still possible thereby to compensate for tolerances in the longitudinal direction, or axial direction, of the selector shaft, as was the case previously in the prior art. If the block angle is modified, the intermediate compensating element can move freely between the selector shaft and the adjustment element in the radial direction, wherein the intermediate compensating element is not subjected to axial forces. The intermediate compensating element can be readily replaced when it becomes worn.

It has proven to be particularly advantageous when the design of the motor vehicle steering lock according to the invention provides that the selector shaft has at least one coupling projection projecting in the direction of the longitudinal axis at its free longitudinal end, which is inserted into at least one coupling receiver formed in the intermediate compensating element without any play in the second axis direction, and is able to move in the first axis direction. The coupling projection can be formed either centrally or eccentrically on the free longitudinal end of the selector shaft thereby. In particular, the coupling projection is fit into the coupling receiver such that it exhibits play in the first axis direction, and no play in the second axis direction.

It is then particularly useful structurally when, in the design of the invention, the coupling projection is designed as a central, transverse coupling tab in the free longitudinal end of the selector shaft, and the coupling receiver is designed as a coupling slot formed in one of the lateral surfaces of the intermediate compensating element facing the selector shaft, wherein the coupling tab fits into the coupling slot, with play in the longitudinal direction and in the direction of first axis.

Regarding the other relative movement, it is likewise advantageous in the design of the invention when the adjustment element has at least one connecting projection projecting in the direction of the longitudinal axis, which is inserted into at least one connecting receiver formed in the intermediate compensating element such that it can move in the second axis direction and exhibits no play in relation to the first axis direction. In particular, the connecting projection fits into the connecting receiver with play in the second axis direction, and no play in the first axis direction.

In this regard, the invention provides in a further design that the connecting projection is designed as two diametrically opposed connecting pins on the adjustment element, and the connecting receiver is designed as two radial slots formed in a lateral surface of the intermediate compensating element facing the adjustment element, wherein the connecting pins fit into the radial slots with play in the longitudinal direction and in the direction of the second axis.

In a further design, it is provided that the intermediate compensating element is disk-shaped, wherein the at least one coupling receiver and/or the at least one connecting receiver are formed as recesses in a respective lateral surface of the intermediate compensating element, or as through holes in the intermediate compensating element.

In order to eliminate tension along two axes in the connection of the lock cylinder selector shaft to the ignition switch adjustment element, the invention provides in a further design that the at least one coupling receiver and the at least one connecting receiver are formed on opposite lateral surfaces of the intermediate compensating element as grooves offset to one another by 90°.

With regard to an inexpensive and simple production of the intermediate compensating element, the invention provides in a further design that the intermediate compensating element is a plastic component. As a result, the plastic component, or the intermediate compensating element, respectively, can be produced inexpensively in a standard injection molding process.

In an alternative design, the invention provides that the selector shaft has at least one coupling depression on its free longitudinal end, extending in the direction of the longitudinal axis, which receives a coupling projection formed on a lateral surface of the intermediate compensating element, without play in the first axis direction, and able to move in the second axis direction.

Lastly, in a further development of the alternative design the invention provides that the adjustment element has at least one connecting depression extending in the direction of the longitudinal axis, which receives a connecting projection formed on a lateral surface of the intermediate compensating element lying opposite the coupling projection, such that it can move in the first axis direction, and exhibits no play in relation to the second axis direction.

It is understood that the features specified above and still to be explained below can be used not only in the respective given combinations, but also in other combinations or in and of themselves, without abandoning the framework of the present invention. The framework of the invention is defined only by the claims.

BRIEF DESCRIPTION OF THE DRAWINGS

Further details, features and advantages of the subject matter of the invention can be derived from the following description in conjunction with the drawings, in which a preferred exemplary embodiment of the invention is depicted. Therein:

FIG. 4 shows an exploded view of the components of the motor vehicle steering lock according to the invention shown in FIG. 3, FIG. 5 shows the intermediate compensating element shown in FIGS. 3 and 4 in a perspective view, FIG. 6 shows an enlarged view of the selector shaft and the intermediate compensating element, and FIG. 7 shows an enlarged view of the adjustment element and the intermediate compensating element.

DETAILED DESCRIPTION

Figure 1:
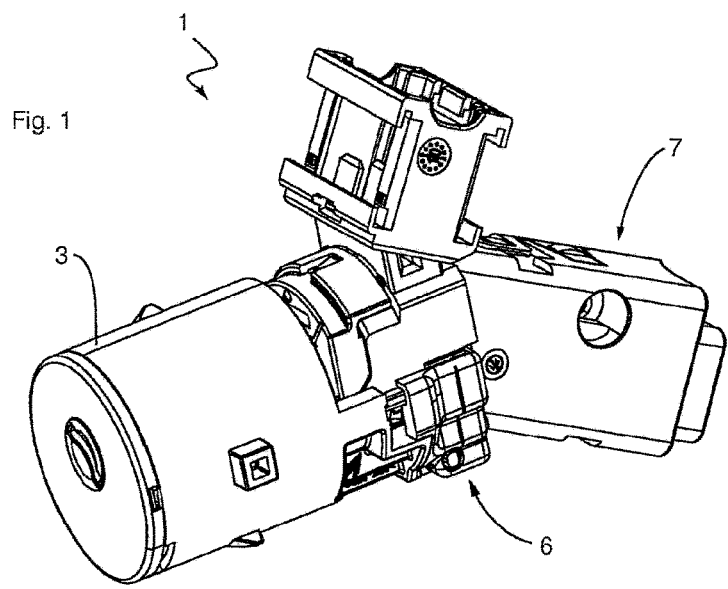
FIG. 1 shows a motor vehicle steering lock according to the invention in a perspective view.
Figure 2:
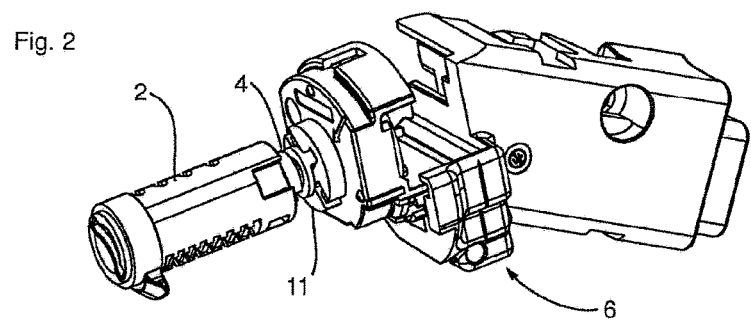
FIG. 2 shows the motor vehicle steering lock according to the invention without a housing in a further perspective depiction.
Figure 3:
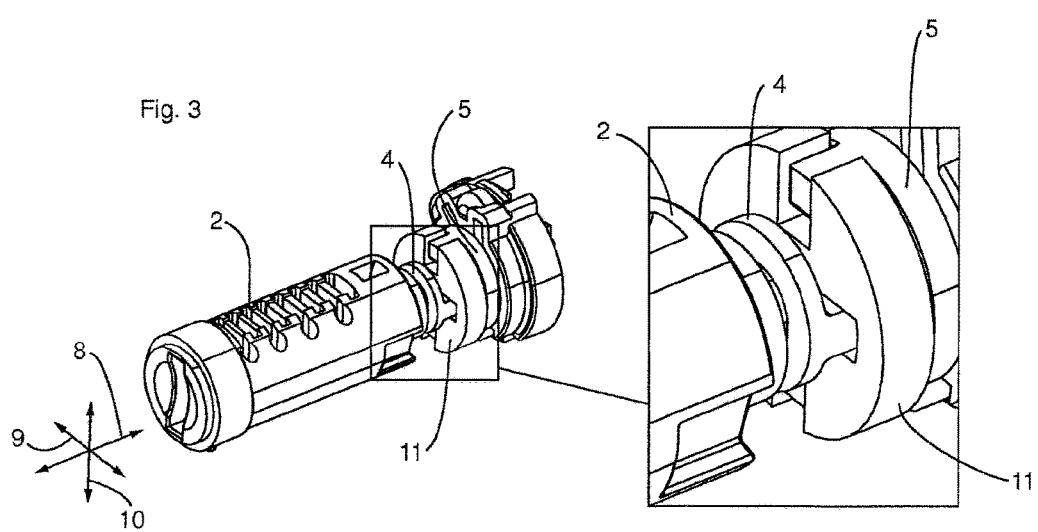
FIG. 3 shows a perspective view of a lock cylinder that has a selector shaft, an adjustment element of an ignition switch, and an intermediate compensating element disposed therebetween.

A motor vehicle steering lock is shown in FIG. 1. The motor vehicle steering lock 1 has a lock cylinder 2, shown in greater detail in FIG. 2, which is covered by a housing 3 in FIG. 1. In other words, the lock cylinder 2 is disposed in the housing 3 that forms a cover, and has a selector shaft 4, which can assume various rotational positions through the use of a mechanical key, when a valid key is inserted through the keyhole on the end of the housing 3 into the rotating lock cylinder 2 and turned. The selector shaft 3 is moveably coupled to an adjustment element 5 of an ignition switch 6, such that a rotational movement of the selector shaft 3 results in a rotation of the adjustment element 5 when the lock cylinder 2 is rotated. Depending on the rotational position, the ignition switch 6 triggers a desired function in the motor vehicle, e.g. supplying power in the motor vehicle exclusively from the starter battery, e.g. for the radio, or to supply power for the ignition, and for motor loads.

The connection of the selector shaft 3 and the adjustment element 5 according to the invention is shown in the schematic illustrations in FIGS. 3 to 7, wherein, for reasons of clarity, the other components of the motor vehicle steering lock 1, e.g. steering locking device 7, or the housing 3 in FIG. 1, are not shown.

In accordance with the present invention with reference to FIGS. 2 to 7, the selector shaft 4 of the lock cylinder 2 and the adjustment element 5 of the ignition switch 6 are connected for conjoint rotation via an intermediate compensating element 11. The intermediate compensating element 11 is designed such that allows for a movement of the selector shaft 4 in relation to the adjustment element 5 in a first axis direction 9 radial to the longitudinal axis 8 of the selector shaft 4, and a movement of the adjustment element 5 in relation to the selector shaft 4 in a second axis direction 10, perpendicular to the first axis direction 9. In order to enable this dual-axis freedom as set forth in the invention, the selector shaft 4 has a coupling projection 14 on its free longitudinal end 12, as can be seen, for example, in FIG. 4. The coupling projection 14 extends in the direction of the longitudinal axis 8 (see, e.g., FIG. 6), and is inserted into a coupling receiver 15 in the assembled state of the motor vehicle steering lock 1, which is formed in the intermediate compensating element 11. The coupling projection 14 of the selector shaft 4 and the coupling receiver 15 of the intermediate compensating element 11 are designed in relation to one another such that the coupling projection 14 is inserted in the coupling receiver 15 with play in relation to the first axis direction 9, and without play in the second axis direction 10. In this manner, the intermediate compensating element 11 obtains a first axis freedom. In other words, the selector shaft 4 has a degree of freedom of movement in the first axis direction 9, wherein it can always move in the direction of the longitudinal axis 8. As a matter of course, not only one coupling projection 14, but rather, numerous tab-shaped projections can be inserted into the one or more corresponding coupling receivers 15 with play in the first axis direction 9. In the exemplary embodiment shown in the figures, the coupling projection 14 is designed as a central, transverse coupling tab 16 on the free longitudinal end 12 of the selector shaft 4. Accordingly, the coupling receiver 15 is designed as a coupling slot 18, formed in a lateral surface 17 (see FIG. 7) of the intermediate compensating element 11 facing the selector shaft 4. With regard to the desired dual-axis freedom of movement, the coupling tab 16 fits into the coupling slot 18 with play in the longitudinal direction 8, and in the second axis direction 10, such that the selector shaft 4, and thus the lock cylinder 2, can move in the intermediate compensating element 11 in the first axis direction 9 and in relation to the adjustment element 5. The coupling tab 16 of the selector shaft 4 of the lock cylinder 2, and the coupling slot 18 of the intermediate compensating element 11 running in the first axis direction 9 thus ensure a degree of freedom of movement for the selector shaft 4 in relation to the adjustment element 5 in one spatial direction.

For a further degree of freedom of relative movement, the invention provides that the adjustment element 5 has a connecting projection 19, projecting in the direction of the longitudinal axis 8. The connecting projection 19 is inserted into a connecting receiver 20. The connecting receiver 20 is formed in the intermediate compensating element 11 such that the connecting projection 19 can move in the second axis direction 10, and is coupled to the intermediate compensating element 11 without play in relation to the first axis direction 9. It is to be understood that more than one connecting projection 19 may be provided, each of which fits into a single corresponding connecting receiver 20 with play in the second axis direction 10. As can be derived, however, from the concrete exemplary embodiment in the figures, the connecting projection 19 comprises two, diametrically opposed connecting pins 21, formed on the adjustment element 5. Accordingly, the connecting receiver 20 has two radial slots 22 formed in a lateral surface 23 (see FIG. 6) of the intermediate compensating element 11 facing the adjustment element 5. In order to obtain the desired degree of freedom of movement, the connecting pins 21 fit into the dedicated radial slots 22 with play in the longitudinal direction 8, and in particular with play in the direction of the second axis 10.

The slot-shaped design of the coupling receivers 15 and the connecting receivers 20 in the intermediate compensating element 11 contributes to a reduction in the necessary installation space in the axial direction, i.e. in the direction of the longitudinal axis 8, because if the receivers for the projections 14, 19 of the selector shaft 4 and adjustment element 5 are designed as projections on the lateral surfaces 17, 23 of the intermediate compensating element 11, the installation space would be elongated in the direction of the longitudinal axis 8, and thus increased. Accordingly, the intermediate compensating element 11 has a disk-shaped design, and is preferably thin, wherein the coupling receivers 15 and/or the connecting receivers 20 are formed as respective recesses in a dedicated lateral surface 17, 23 of the intermediate compensating element 11, or as through holes in the intermediate compensating element 11. In the exemplary embodiment shown in the figures, the receivers 15, 20 are designed as through holes, which is the most beneficial design with respect to the installation space for the motor vehicle steering lock 1. In this manner, the dual-axis freedom of movement of the selector shaft 4 and the adjustment element 5 is obtained as described above, wherein the coupling receivers 15, or the coupling slots 18, and the connecting receivers 20, or the radial slots 22, respectively, are formed as grooves, offset 90° to one another, on the opposing lateral surfaces 17, 23 of the intermediate compensating element 11, which is a plastic component.

As an alternative to the embodiment described above and shown in the figures, it is also conceivable to reverse the arrangement of the recesses and projections on the respective components. By way of example, in an alternative design, the selector shaft 4 could have at least one coupling depression on its free longitudinal end 12, extending in the direction of the longitudinal axis 8. This coupling depression would then receive a coupling projection formed on a lateral surface 17 of the intermediate compensating element 11, such that there is no play in the first axis direction 9, and such that it can move in the second axis direction 10. Accordingly, with this alternative design of the motor vehicle steering lock 1, the adjustment element 5 would have at least one connecting depression, which extends in the direction of the longitudinal axis 8. This connecting depression would then receive a connecting projection that can move in the first axis direction 9, and is without play in the second axis direction 10, wherein the connecting projection would then be formed on a lateral surface 23 of the intermediate compensating element 11 lying opposite the coupling projection.

The terms, "without play," and "lack of play," as set forth in the invention, mean that if there is lack of play in the first axis direction 9, using the coupling projection 14 by way of example, it is not possible for the coupling projection 14 to move in the first axis direction 9.

Through the intermediate compensating element 11 described above, it is possible to compensate for tolerances between the selector shaft 4 of the lock cylinder 2 and the controlling adjustment element 5 of the ignition switch 6.

The invention described above is not limited to the embodiment described and illustrated herein as a matter of course. It is clear that numerous modifications can be made to the embodiment illustrated in the drawings, which are obvious to the person skilled in the art with regard to the intended application, without abandoning the field of the invention. By way of example, the directions of lack of play and freedom of movement for the selector shaft 4 and/or the adjustment element 5 can be exchanged with respect to the exemplary embodiment shown in the figures. Everything contained in the description and/or shown in the drawings, including that which is obvious to the person skilled in the art, deviating from the concrete exemplary embodiment, belongs to the invention.

The invention claimed is:

1. A motor vehicle steering lock comprising a housing in which is disposed a lock cylinder including a selector shaft, which can assume various rotational positions, and an adjustment element of an ignition switch that is moveably coupled to the selector shaft of the lock cylinder, wherein the adjustment element triggers a desired function in the motor vehicle, depending on the rotational position of the selector shaft, and wherein the selector shaft of the lock cylinder and the adjustment element of the ignition switch are connected for conjoint rotation via an intermediate compensating element that allows for a movement of the selector shaft in relation to the adjustment element in a first axis direction, oriented radial to a longitudinal axis of the selector shaft, and a movement of the adjustment element in relation to the selector shaft in a second axis direction, perpendicular to the first axis direction.

2. The motor vehicle steering lock according to claim 1, wherein the selector shaft has at least one coupling projection on its free longitudinal end, projecting in the direction of the longitudinal axis, which coupling projection is inserted into at least one coupling receiver formed in the intermediate compensating element, without play in relation to the second axis direction and able to move in the first axis direction.

3. The motor vehicle steering lock according to claim 2, wherein the coupling projection is designed as a central, transverse coupling tab on the free longitudinal end of the selector shaft, and the coupling receiver is designed as a coupling slot formed in a lateral surface of the intermediate compensating element facing the selector shaft, wherein the coupling tab fits into the coupling slot with play in the longitudinal direction and in the first axis direction.

4. The motor vehicle steering lock according to claim 1, wherein the adjustment element has at least one connecting projection that extends in the direction of the longitudinal axis, which is inserted into at least one connecting receiver formed in the intermediate compensating element, such that the connecting projection can move in the second axis direction, and is without play in relation to the first axis direction.

5. The motor vehicle steering lock according to claim 4, wherein the connecting projection is designed as two diametrically opposing connecting pins on the adjustment element, and the connecting receiver is designed as two radial slots formed in a lateral surface of the intermediate compensating element facing the adjustment element, wherein the connecting pins are fit into the radial slots with play in the longitudinal direction and in the second axis direction.

6. The motor vehicle steering lock according to claim 3, wherein the intermediate compensating element has a disk-shaped design, wherein the at least one coupling receiver and/or the at least one connecting receiver are formed as recesses in a respective lateral surface of the intermediate compensating element, or as through holes in the intermediate compensating element.

7. The motor vehicle steering lock according to claim 6, wherein the at least one coupling receiver and the at least one connecting receiver are formed on opposite lateral surfaces of the intermediate compensating element as grooves offset to one another by 90°.

8. The motor vehicle steering lock according to claim 1, wherein the intermediate compensating element is a plastic component.

9. The motor vehicle steering lock according to claim 1, wherein the selector shaft has at least one coupling depression on its free longitudinal end extending in the direction of the longitudinal axis, which receives a coupling projection formed on a lateral surface of the intermediate compensating element, without play in relation to the first axis direction and able to move in the second axis direction.

10. The motor vehicle steering lock according to claim 9, wherein the adjustment element has at least one connecting depression extending, in the direction of the longitudinal axis, which receives a connecting projection formed on a lateral surface of the intermediate compensating element lying opposite the coupling projection, such that the connecting projection can move in the first axis direction and is without play in relation to the second axis direction.

* * * * *